(12) United States Patent
Boguslawski

(10) Patent No.: US 9,150,137 B2
(45) Date of Patent: Oct. 6, 2015

(54) APPARATUS AND METHOD FOR A COLLAPSIBLE ARCHED RAMP

(71) Applicant: Bosski, Inc., Caldwell, ID (US)

(72) Inventor: John Boguslawski, Fall Creek, ID (US)

(73) Assignee: Bosski, Inc., Caldwell, ID (US)

( * ) Notice: Subject to any disclaimer, the term of this patent is extended or adjusted under 35 U.S.C. 154(b) by 0 days.

(21) Appl. No.: 14/330,105

(22) Filed: Jul. 14, 2014

(65) Prior Publication Data

US 2014/0321955 A1    Oct. 30, 2014

Related U.S. Application Data

(63) Continuation of application No. 13/301,004, filed on Nov. 21, 2011, now Pat. No. 8,821,102.

(51) Int. Cl.
*B60P 1/43* (2006.01)
*B65G 69/30* (2006.01)
*B65G 69/28* (2006.01)

(52) U.S. Cl.
CPC .............. *B60P 1/43* (2013.01); *B65G 69/287* (2013.01); *B65G 69/30* (2013.01); *Y10T 29/4984* (2015.01)

(58) Field of Classification Search
CPC ........... B60P 1/43; B65G 69/30; A61G 3/061
USPC ............................................ 14/71.1; 414/537
See application file for complete search history.

(56) References Cited

U.S. PATENT DOCUMENTS

| | | |
|---|---|---|
| 1,944,696 A | 1/1934 | Reichl |
| 3,818,528 A | 6/1974 | Petersen |
| 3,977,545 A | 8/1976 | Lloyd |
| 4,795,304 A | 1/1989 | Dudley |
| 5,287,579 A | 2/1994 | Estevez, Jr. |
| 5,312,148 A | 5/1994 | Morgan |
| 5,538,308 A | 7/1996 | Floe |
| 5,634,228 A | 6/1997 | Johnston |
| 5,645,394 A | 7/1997 | Hays |
| 5,671,496 A | 9/1997 | Smith |
| 5,853,281 A | 12/1998 | Farmer |
| 5,988,725 A | 11/1999 | Cole |
| 6,139,249 A | 10/2000 | Lucht |
| 6,185,775 B1 | 2/2001 | McCarthy |
| 6,698,998 B2 | 3/2004 | Koretsky |
| 6,837,669 B2 | 1/2005 | Reed et al. |
| 7,082,637 B1 | 8/2006 | Griffin |
| 7,179,042 B1 | 2/2007 | Hartmann et al. |

(Continued)

*Primary Examiner* — James Keenan
(74) *Attorney, Agent, or Firm* — Chandra E. Eidt; Miller Nash Graham & Dunn LLP

(57) ABSTRACT

An apparatus and method for a collapsible arched ramp includes an arched vertically extending middle ramp section, two arched vertically extending outer ramp sections, and two arched vertically extending connecting ramp sections. The connecting ramp sections connect the outer ramp sections to opposing vertical sides of the middle ramp section so that the outer ramp sections are substantially parallel and laterally spaced apart with the middle ramp section. The arches of the outer ramp sections arch in a same direction of the arch of the middle ramp section and arch in the opposite direction of the middle ramp section. When collapsing the ramp, the direction of the arched sections line up, allowing for a compact assembly that may be easily carried and stored. The method of extending and collapsing the ramp allows for a ramp that is rapidly and efficiently assembled.

18 Claims, 2 Drawing Sheets

(56) References Cited

U.S. PATENT DOCUMENTS

| | | |
|---|---|---|
| 7,299,517 B1 | 11/2007 | Adinolfe |
| 7,526,826 B2 | 5/2009 | Bailie |
| 7,653,957 B1 | 2/2010 | Curtiss |
| 7,793,374 B1 | 9/2010 | Anderson et al. |
| 7,958,586 B1 | 6/2011 | Carter |
| 8,256,053 B2 | 9/2012 | Astor et al. |
| 8,561,238 B1 | 10/2013 | Inget |
| 2004/0223836 A1 | 11/2004 | Robertson |
| 2005/0196260 A1 | 9/2005 | Asfeld |
| 2012/0297558 A1 | 11/2012 | Wang et al. |

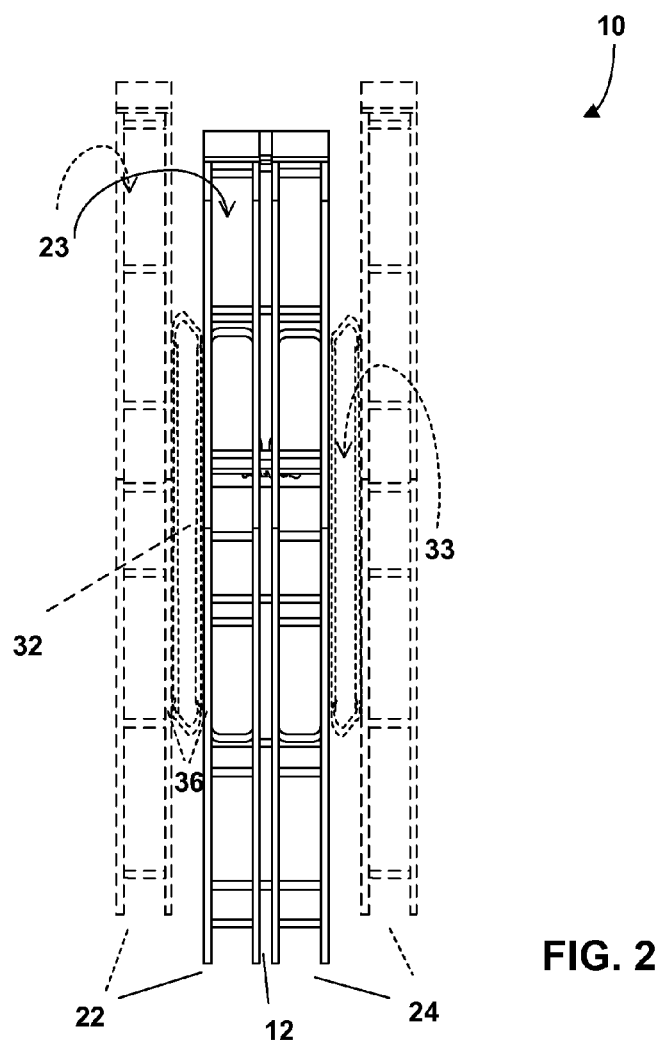
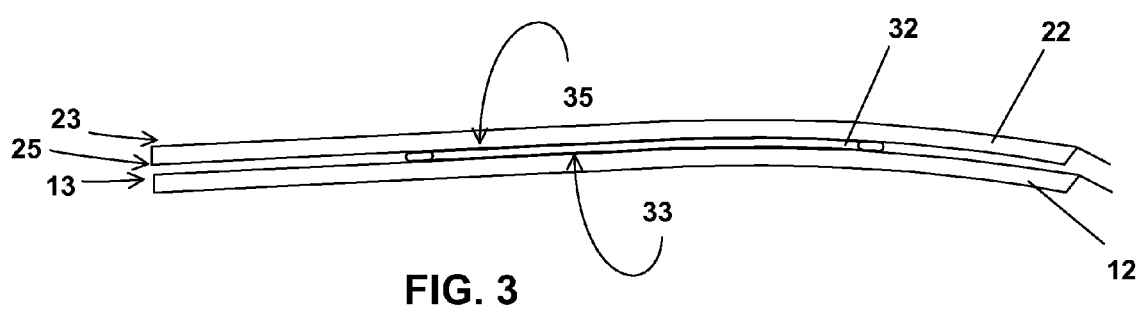

APPARATUS AND METHOD FOR A COLLAPSIBLE ARCHED RAMP

RELATED APPLICATIONS

This application is a continuation of U.S. patent application Ser. No. 13/301,004 filed on Nov. 21, 2011, titled "Apparatus and Method for a Collapsible Arched Ramp," which is incorporated herein by reference.

FIELD OF THE INVENTION

This disclosure relates to an apparatus and method for a collapsible ramp assembly, and more specifically relates to a collapsible arched ramp for loading snowmobiles onto a transport vehicle.

BACKGROUND OF THE INVENTION

As the popularity of outdoor sports and recreational activities increase, the desire for the ease and efficiency of loading and transporting the associated equipment and/or accessories also increase. Depending on its size and shape, some equipment for sports and recreational activities are fairly easy to load. Other larger or bulkier equipment, such as small recreational vehicles, are more of a challenge to load. One affordable solution to loading small recreational vehicles, such as snowmobiles, onto a transporting vehicle, such as a truck, is through a portable ramp.

There are several prior art portable ramp assemblies for loading small recreational vehicles, including some which consist of a solid piece of material, with no movable parts, and some, which are divided into sections that allow the ramp to be assembled, folded or collapsed. The disadvantage of a ramp made of the solid piece of material, though, is that is may be awkward to move, and a nuisance to store when not in use.

Foldable or collapsible ramps vary depending upon, among other things, the desired direction of the fold and the hinges used for folding. A foldable ramp may fold vertical, such that there are two or three solid vertical sections that hinge together for folding thereon, or for expanding and collapsing close to each other. These sections are normally flat for ease of folding and will fold out to a flat ramp. Although vertical folding ramps such as these are more portable and storable than a single solid piece ramp assembly, they do not provide much clearance for a small recreational vehicle when loading onto a back of a truck, the recreational vehicle being loaded may have a difficult time in loading and unloading onto a ramp with a flat surface, and the ramp may be awkward or time-consuming to fold out or set into place.

A horizontally foldable ramp may be formed to fold out to provide an arching of the ramp, thus allowing more ease in loading and unloading, and providing more clearance for the recreational vehicle. Unfortunately, to form an arch on the ramp, a horizontally foldable or collapsible ramp normally consists of many sections, which in turn, consist of many hinges, and/or connecting pieces. Thus, there are many parts that can wear out and that need to be replaced, making it less cost effective. Furthermore, a horizontally foldable ramp may also be awkward and time-consuming to fold out or set into place.

Thus, there is a need to provide a collapsible ramp that is easily and quickly assembled, provides ease and clearance in loading and unloading a recreational vehicle onto a transport vehicle, and is durable and cost effective.

SUMMARY OF THE INVENTION

An apparatus and method for a collapsible arched ramp includes an arched vertically extending middle ramp section, two arched vertically extending outer ramp sections, and two arched vertically extending connecting ramp sections. The two connecting ramp sections connect the two outer ramp sections, respectively, to opposing vertical sides of the middle ramp section so that the two outer ramp sections are substantially parallel and laterally spaced apart with the middle ramp section. The arches of the two outer ramp sections arch in a same direction of the arch of the middle ramp section. The arches of the two connecting ramp sections arch in the opposite direction of the middle ramp section. When loading and unloading onto a transport vehicle, the arching provides clearance and ease of loading and unloading for a small recreational vehicle.

When collapsing the collapsible arched ramp, the direction of the arched sections line up, allowing for a compact assembly that may be easily carried and stored. The method of unfolding and folding the collapsible arched ramp allows for a collapsible arched ramp that is rapidly and efficiently assembled.

The foregoing and other features will be apparent from the following more particular description, as illustrated in the accompanying drawings.

DESCRIPTION OF THE DRAWINGS

The disclosure will be described in conjunction with the appended drawings, where like designations denote like elements, and:

FIG. 2 is a top view of the ramp of FIG. 1, without element 44, illustrating both a partially collapsed and collapsed orientation; and FIG. 3 is a side view of the ramp of FIG. 2, wherein the ramp is in the collapsed orientation.

DETAILED DESCRIPTION

Figure 1:
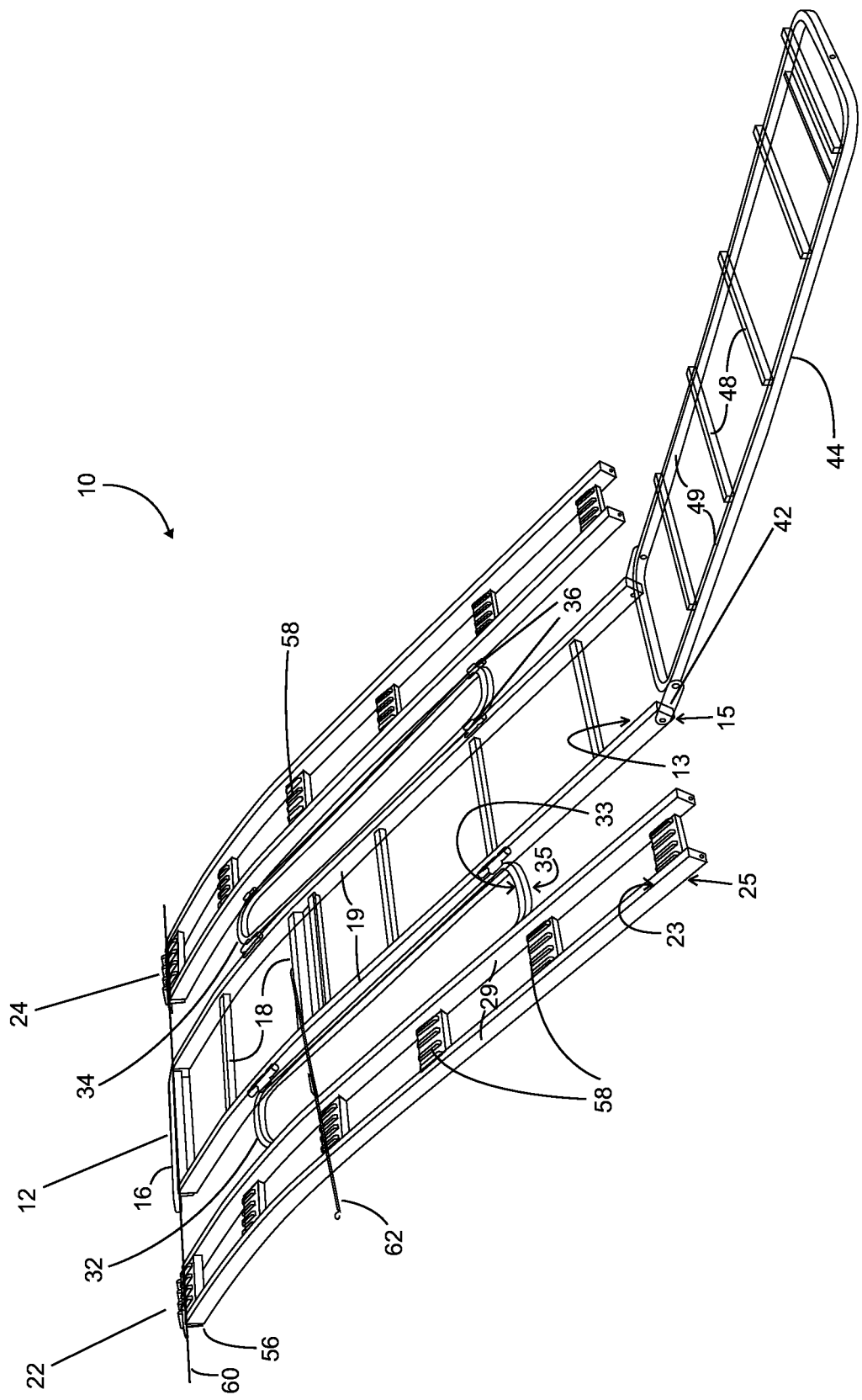
FIG. 1 is a perspective view of a collapsible arched ramp.

As seen in FIG. 1, a collapsible arched ramp 10 includes a middle ramp section 12, two outer ramp sections 22 and 24, and two connecting ramp sections 32 and 34. Middle ramp section 12 vertically extends a first predetermined length and includes a top surface 13, and a bottom surface 15. Rungs 18 extend laterally between outer rails 19 on middle ramp section 12 and are spaced longitudinally apart therealong, supporting a small recreational vehicle as it ascends up the ramp. Middle ramp section 12 is arched in a first direction, wherein when middle ramp section 12 is in an inclined position, a top portion of middle ramp section 12 slightly curves downward. When attaching collapsible arched ramp 10 to a transport vehicle 60 with attachment piece 16, top portion of middle ramp section 12 curves towards transport vehicle 60. A second attachment piece 62, connected to a middle rung 18 on one end allows collapsible arched ramp 10 to be stabilized by connecting the other end of second attachment piece 62 to a transport vehicle. The arching of middle ramp section 12 provides clearance and ease of loading and unloading a small recreational vehicle onto a transport vehicle. Middle ramp section 12 may be made of a strong, but lightweight material, such as aluminum, but also may be manufactured from other materials that are well known in the art and is not limited to such.

Outer ramp sections 22 and 24 are substantially parallel to and laterally spaced apart on either vertical side of middle ramp section 12. Each outer ramp section 22 and 24 vertically extends a second predetermined length that is approximately equal to first length of middle ramp section 12. Outer ramp section 22 includes a top surface 23 and a bottom surface 25. All though not specifically detailed, outer ramp section 24 includes the same surfaces as outer ramp section 22. Both outer ramp sections 22 and 24 are arched substantially in the same direction as middle ramp section 12. Specifically, when outer ramp sections 22 and 24 are in an inclined position, a top portion of outer ramp sections 22 and 24 slightly curve downward. Thus, a top portion of outer ramp sections 22 and 24 curve towards the transport vehicle 60 when attaching collapsible arched ramp 10 with attachment piece 56 to a transport vehicle 60. Guides 58 extend laterally between two rails 29 of outer ramp section 22 and are spaced longitudinally apart therealong, supporting, for example, the skis of a snowmobile as it ascends up the ramp. Guides 58 may be made of plastic or a similar formed material. Again, although only outer ramp section 22 is described in detail, it is to be understood that outer ramp section 24 has the same features, surfaces and portions as outer ramp section 22. Outer ramp sections 22 and 24 may be made of a strong, but lightweight material, such as aluminum, but also may be manufactured from other materials that are well known in the art and is not limited to such.

Connecting ramp sections 32 and 34 connect outer ramp sections 22 and 24 to opposing vertical sides of middle ramp section 12 so that outer ramp sections 22 and 24 are substantially parallel and laterally spaced apart with the middle ramp section 12. Connecting ramp sections 32 and 34 have a top surface 33, a bottom surface 35 and hinge members 36. Although not specifically detailed, connecting ramp sections 32 and 34 are similar in shape and features and have at least two hinges each. For this specific example, two hinges on one side of connecting ramp section 32 connect connecting ramp section 32 to middle ramp section 12 and two hinges on the opposing side of connecting ramp section 32 connect connecting ramp section 32 to outer ramp section 22. Likewise, two hinges on one side of connecting ramp section 34 connect connecting ramp section 34 to middle ramp section 12 and two hinges on the opposing side of connecting ramp section 34 connect connecting ramp section 34 to outer ramp section 24. Hinge members 36 are pivotally rotatable around an axis and will be described in more detail hereafter. Although for this specific example, two hinges are shown on either side of connecting ramp sections 32 and 34, the invention in not limited to such, and many other number of hinges may be used, such as one or four, without departing from the scope of the invention. Connecting ramp sections 32 and 34 are of a third predetermined length, the length being of a smaller length than the first or second predetermined length. That is, a vertical length of the connecting ramp section 32 or 34 is smaller than a vertical length of the middle ramp section 12. Both connecting ramp sections 32 and 34 are arched substantially in the opposite direction as middle ramp section 12. Specifically, when connecting ramp sections 32 and 34 are in an inclined position, a top portion of connecting ramp sections 32 and 34 slightly curve upwards. As will be discussed in greater detail in regards to FIG. 3, the arching of connecting ramp sections 32 and 34 allows collapsible arched ramp 10 to collapse in a tight, parallel manner, making it easy to transport and store. Although connecting ramp sections 32 and 34 are shown of a predetermined width, they also may be made adjustable to allow for different sized recreational vehicles and the invention is not limited to such. Connecting ramp sections 32 and 34 may be made of a strong, but lightweight material, such as aluminum, but also may be manufactured from other materials that are well known in the art and is not limited to such.

Traction control section 44 of collapsible arched ramp 10 is connected to middle ramp section 12 through hinges (at least two) on the bottom portion of middle ramp section 12. Specifically, hinge 42 connects a rail 49 of traction control section 44 to a rail 19 of middle ramp section 12. Although only one hinge is described, it is to be understood that there is at least one more hinge connecting the other rail of middle ramp section 12 to fraction control section 44. Traction control section 44 allows for the loading of small vehicles onto transport vehicle 60 even when there is snow, rain, or other slippery substances on the ground. Rungs 48, similar to rungs 18 of middle ramp section 12 extend laterally on traction control section 44 on rails 49 and are spaced longitudinally apart therealong. Traction control section 44 may be made of a strong, but lightweight material, such as aluminum, but also may be manufactured from other materials that are well known in the art and is not limited to such.

As seen in FIG. 2, collapsible arched ramp 10 is shown in both a partially collapsed orientation (elements 22, 24 and 32 in dotted outline) and a fully collapsed orientation (elements 22, 24 and 12 in solid outline). Hinges 36 allow the outer ramp section 22 to pivotally collapse upon middle ramp section 12, wherein top surface 33 of connecting ramp section 32 pivotally collapses upon top surface 13 (see FIG. 1) of middle ramp section 12 and bottom surface 25 (see FIG. 1) of outer ramp section 22 pivotally collapses on bottom surface 35 (see FIG. 1) of connecting ramp section 32. Top surface 23 of outer ramp section 22 remains on top in extended orientation, partially collapsed orientation and fully collapsed orientation. Although not specifically discussed in reference to outer ramp section 24, it is to be understood that it collapses in a similar way as outer ramp section 22. Outer ramp section 22 collapses on approximately one vertical half of middle ramp section 12, and outer ramp section 24 collapses on approximately the other vertical half of middle ramp section 12. Although not specifically shown, traction control section 44 (see FIG. 1) could then collapse onto top surface 23 of outer ramp section 22.

FIG. 3 illustrates the side view of FIG. 2 when in a fully collapsed orientation. Middle ramp section 12 is shown as the bottom layer, connecting ramp section 32 is shown as the middle layer and outer ramp section 22 as the top layer. As explained in reference to FIG. 2, in collapsed orientation, top surface 33 of connecting ramp section 32 collapses upon top surface 13 of middle ramp section 12 and bottom surface 25 of outer ramp section 22 collapses on bottom surface 35 of connecting ramp 32. Thus, while collapsed, the top surface 13 of middle ramp section 12 is in facing relationship to the top surface 33 of connecting ramp section 32 and the bottom surface 35 of the connecting ramp section 32 is in facing relationship to the bottom surface 25 to outer ramp section 22. The arching of connecting ramp sections 32 and 34 allows collapsible arched ramp 10 to collapse in a tight parallel manner, making it easy to transport and store, without losing the benefits of having an arched ramp. Also, the collapsible ramp of the present invention is easily and quickly assembled, provides ease and clearance in loading and unloading a recreational vehicle onto a transport vehicle, and is durable and cost effective.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, although snowmobiles are specifically disclosed in the present disclosure, it is to be understood that any type of small recreational vehicle may also loaded with the invention and the disclosure is not limited to such. Therefore, reference herein to snowmobiles is only by way of example, and is not intended to be limiting.

The invention claimed is:

1. An apparatus comprising:
    an arched vertically extending middle ramp section;
    two arched vertically extending outer ramp sections, an arch of each of the two outer ramp sections arching in a same direction as an arch of the middle ramp section;
    two connecting ramp sections, each connecting ramp section connecting the two outer ramp sections to opposing vertical sides of the middle ramp section; and
    a traction control section connected to the middle ramp section, wherein the traction control section is connected and pivotally rotatable through at least one hinge to a lower end section of the middle ramp section, includes two vertically extending rails having a length at least about half as long as the arched vertically extending middle ramp section, and has at least one rung extending laterally between the two vertically extending rails, and
    wherein the apparatus may be configured in each of a collapsed orientation and an inclined orientation, wherein the two outer ramp sections are substantially parallel to and laterally spaced apart from the middle ramp section when in the inclined orientation.

2. The apparatus of claim 1, wherein the middle ramp section, the two outer ramp sections, and the two connecting ramp sections further comprise: a top surface and a bottom surface, wherein when the apparatus is configured in the collapsed orientation, the top surface of the middle ramp section is in facing relationship to the top surface of the two connecting ramp sections and the bottom surface of the two connecting ramp sections is in facing relationship to the bottom surface of the two outer ramp sections.

3. The apparatus of claim 1, further comprising: at least one hinge on each of the two connecting ramp sections to pivotally rotate each of the two connecting ramp sections with one of the two outer ramp sections and each of the two connecting ramp sections with the middle ramp section.

4. The apparatus of claim 1, wherein the middle ramp section further comprises: a top section, wherein the top section curves downward from the top surface of the middle ramp section.

5. The apparatus of claim 1, wherein at least one of the two outer ramp sections further comprise: vertical dual rails; and a plurality of guides, the guides extending laterally between the dual rails and spaced longitudinally apart therealong.

6. The apparatus of claim 1, wherein the outer ramp sections are each approximately one half the width of the middle ramp section.

7. The apparatus of claim 1, wherein the traction control section includes multiple rungs extending laterally between the two vertically extending rails and spaced longitudinally apart.

8. The apparatus of claim 1, wherein the arched vertically extending middle ramp section and the two arched vertically extending outer ramp sections provide clearance in loading and unloading a recreational vehicle.

9. An arched collapsible ramp for loading and unloading a snowmobile on a transport vehicle comprising:
    an arched vertically extending middle ramp section having a top section for attaching to the transport vehicle;
    two arched vertically extending outer ramp sections, an arch in each of the two outer ramp sections arching in a same direction as an arch of the middle ramp section;
    two connecting ramp sections; and
    a fraction control section connected to the middle ramp section, wherein the traction control section is connected and pivotally rotatable through at least one hinge to a lower end section of the middle ramp section, includes two vertically extending rails having a length at least about half as long as the arched vertically extending middle ramp section, and has at least one rung extending laterally between the two vertically extending rails, and
    wherein each one of the connecting ramp sections connects to one of the two outer ramp sections and also connects to a vertical side of the middle ramp section, and wherein the two outer ramp sections are substantially parallel with and laterally spaced apart from the middle ramp section.

10. The ramp of claim 9, wherein each of the middle ramp section, the two outer ramp sections, and the two connecting ramp sections further comprises a top surface and a bottom surface, and wherein the apparatus is configured in a collapsed orientation, with the top surface of the middle ramp section in facing relationship to the top surface of the two connecting ramp sections, and the bottom surface of the two connecting ramp sections in facing relationship to the bottom surface of the two outer ramp sections.

11. The ramp of claim 9, further comprising: at least one hinge on each of the two connecting ramp sections to pivotally rotate each of the two connecting ramp sections with one of the two outer ramp sections and each of the two connecting ramp sections with the middle ramp section.

12. The ramp of claim 9, wherein the middle ramp section further comprises:
    a top section, wherein the top section curves downward from the top surface of the middle ramp section and towards the transport vehicle when attached to the transport vehicle.

13. The ramp of claim 9, wherein at least one of the two outer ramp sections further comprises vertical dual rails and a plurality of ski guides, the ski guides extending laterally between the dual rails and spaced longitudinally apart therealong.

14. The ramp of claim 9, wherein the outer ramp sections are each approximately one half the width of the middle ramp section.

15. A method of collapsing an arched collapsible ramp comprising the steps of:
    providing the ramp configured in an inclined orientation;
    providing an arched vertically extending middle ramp section having an arch in a first direction;
    providing at least one arched vertically extending outer ramp section having an arch in a same direction as the first direction;
    providing at least one connecting ramp section;
    providing a traction control section with at least one hinge connected to a lower end section of the middle ramp section and having two vertically extending rails having a length at least about half as long as the arched vertically extending middle ramp section, and at least one rung extending laterally between the two vertically extending rails;
    connecting the at least one outer ramp section to a vertical side of the middle ramp section with the at least one connecting ramp section so that the at least one outer ramp section is substantially parallel with and laterally spaced apart from the middle ramp section; and collapsing the traction control section onto the top surface of the at least one outer ramp section.

16. The method of claim 15, further comprising the steps of:
providing a top surface and a bottom surface on each of the middle ramp section, the at least one outer ramp section, and the at least one connecting ramp section;
collapsing the top surface of the at least one connecting ramp section into a facing relationship with the top surface of the middle ramp section; and
collapsing the bottom surface of the at least one outer ramp section into a facing relationship with the bottom surface of the at least one connecting ramp section.

17. The method of claim 15, further comprising the steps of:
providing the at least one connecting ramp section with at least one hinge;
connecting the at least one connecting ramp section to the middle ramp section and the at least one outer ramp section with the at least one hinge; and
pivotally rotating the at least one connecting ramp section to collapse the at least one connecting ramp section into a facing relationship with the middle ramp section.

18. The method of claim 15, further comprising the step of:
providing the traction control section with multiple rungs extending laterally between the two vertically extending rails and spaced longitudinally apart.

\* \* \* \* \*